(No Model.) 3 Sheets—Sheet 1.
C. A. HENNICKE.
VEHICLE.
No. 571,859. Patented Nov. 24, 1896.
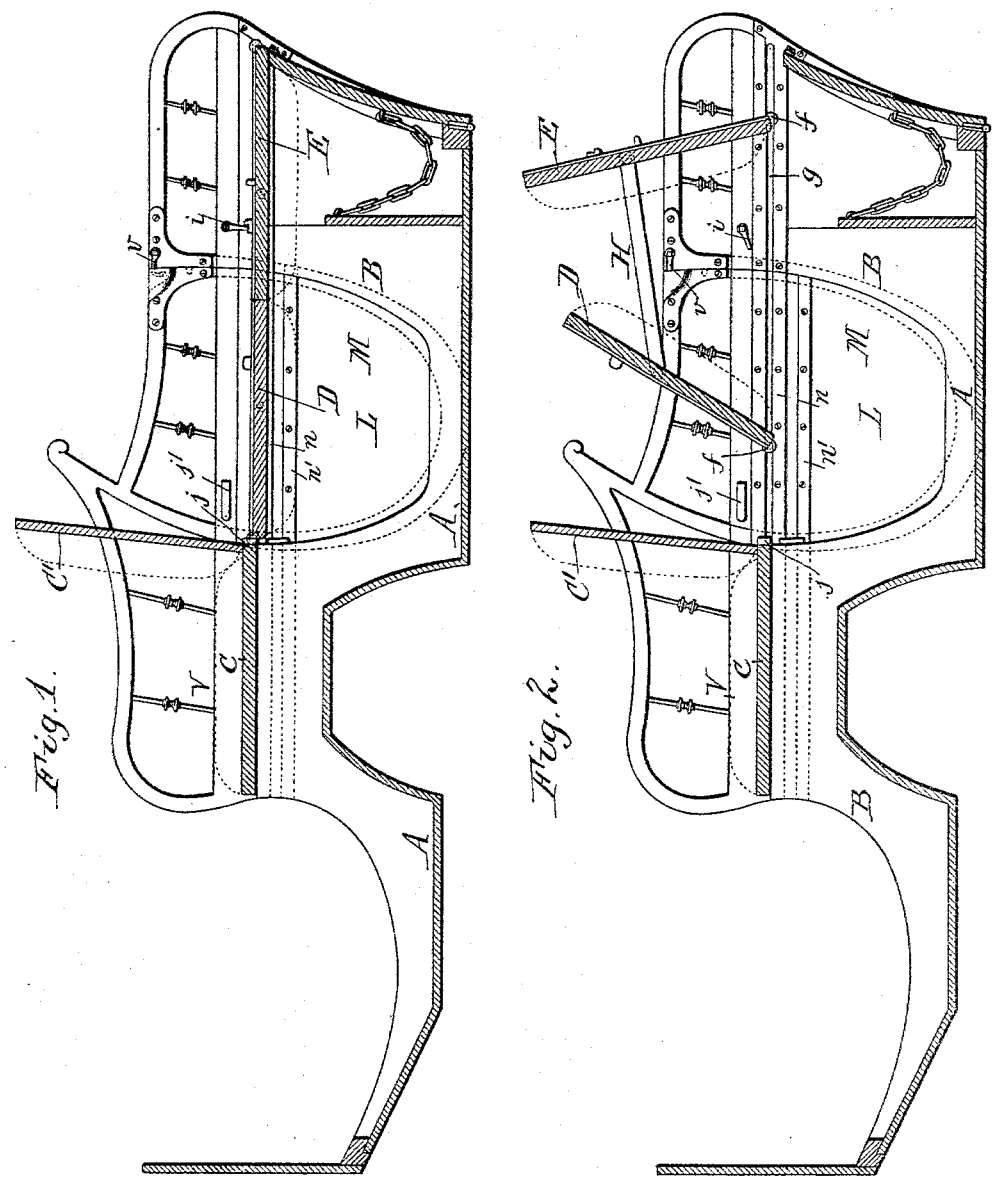
WITNESSES:
Chas. F. Burkhardt
Henry L. Deck.
Chas. A. Hennicke INVENTOR.
By Wilhelm Bonner
ATTORNEYS.

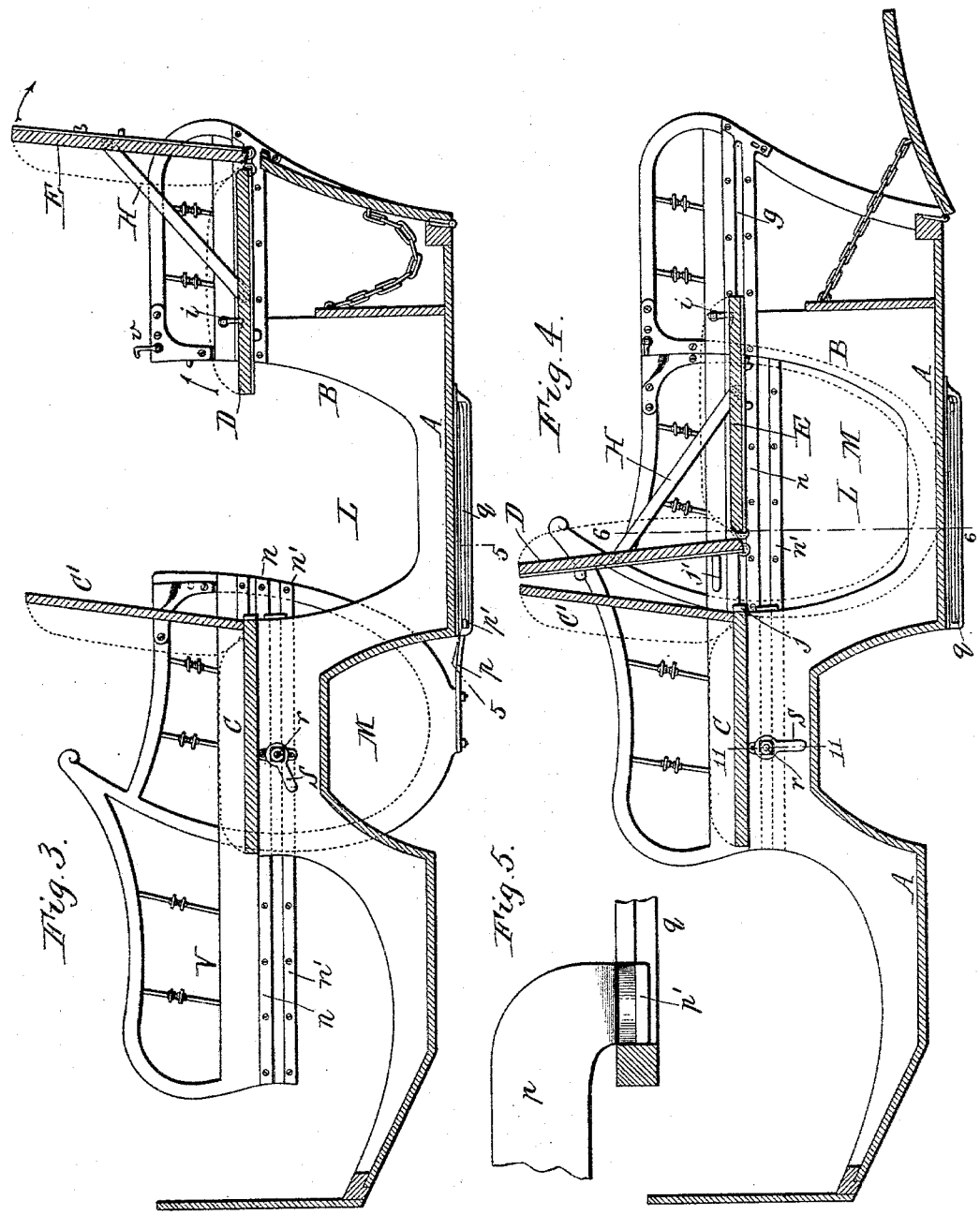

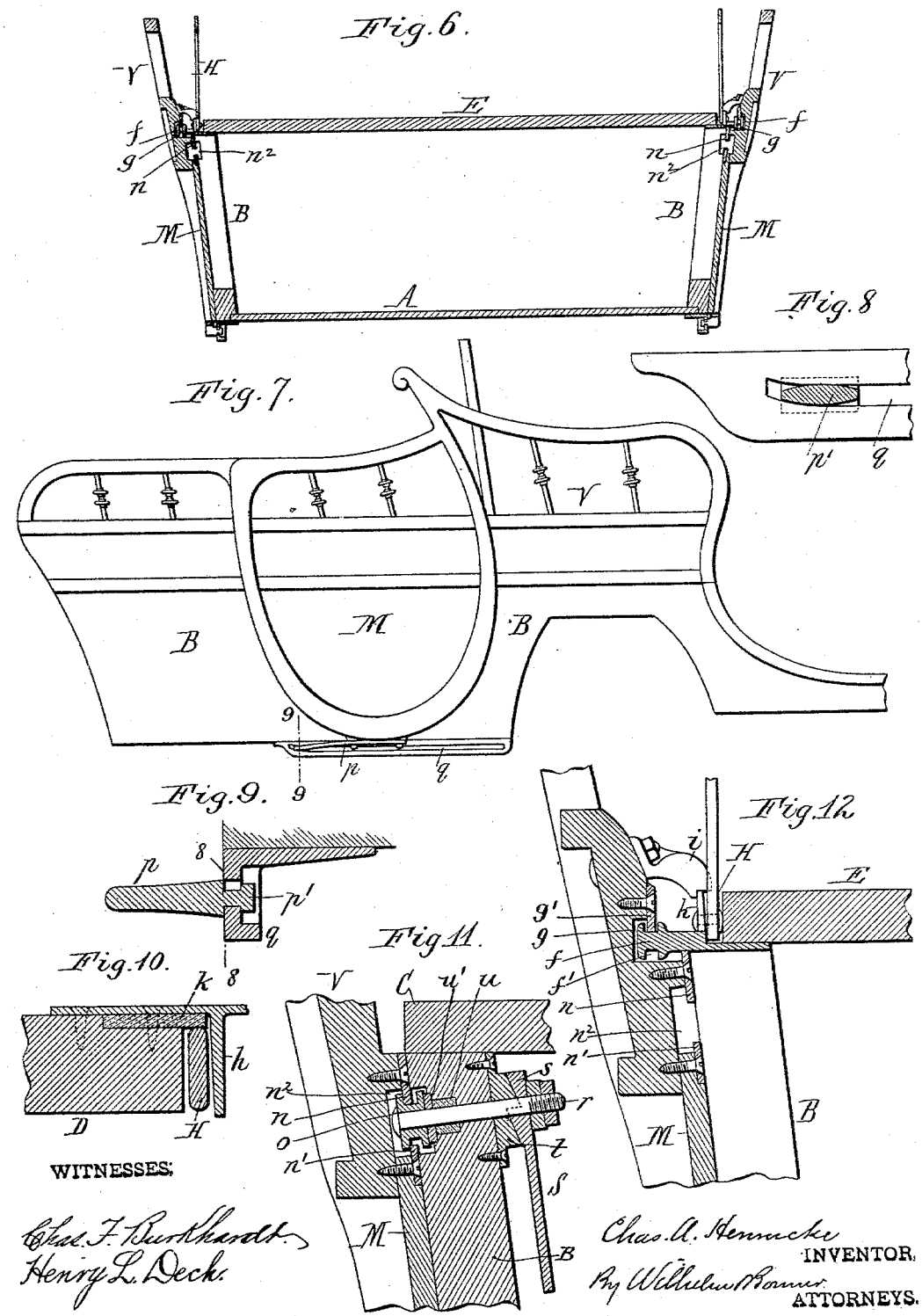

UNITED STATES PATENT OFFICE.

CHARLES A. HENNICKE, OF BUFFALO, NEW YORK.

VEHICLE.

SPECIFICATION forming part of Letters Patent No. 571,859, dated November 24, 1896.

Application filed August 10, 1896. Serial No. 602,337. (No model.)

*To all whom it may concern:*

Be it known that I, CHARLES A. HENNICKE, a citizen of the United States, residing at Buffalo, in the county of Erie and State of New York, have invented a new and useful Improvement in Vehicles, of which the following is a specification.

This invention relates to that class of shifting-seat vehicles which may be converted into a single-seat vehicle, an ordinary two-seated carriage, or a dos-à-dos carriage.

My invention has for its objects to produce a simple vehicle of this character in which the shifting seats are not liable to get out of order, to so construct the vehicle that the rear seat is accessible without disturbing the front seat or its occupants, and to prevent the vibration or rattling of the various parts by simple means.

In the accompanying drawings, consisting of three sheets, Figure 1 is a longitudinal section of the body of my improved vehicle, showing the same in the form of a single-seat carriage. Fig. 2 is a similar section showing the deck-panels partly shifted preliminary to converting the vehicle into an ordinary two-seated carriage. Fig. 3 is a longitudinal section showing the vehicle in the form of an ordinary two-seated carriage with the side doors opened. Fig. 4 is a similar view showing the vehicle in the form of a dos-à-dos carriage. Fig. 5 is a fragmentary horizontal section in line 5 5, Fig. 3, on an enlarged scale. Fig. 6 is a cross-section in line 6 6, Fig. 4. Fig. 7 is a fragmentary side elevation of the vehicle, showing the side doors closed. Fig. 8 is a fragmentary longitudinal section in line 8 8, Fig. 9. Fig. 9 is a cross-section, on an enlarged scale, in line 9 9, Fig. 7. Fig. 10 is a fragmentary cross-section of one of the rear seats or deck-panels, showing the cushion thereof. Fig. 11 is a fragmentary cross-section in line 11 11, Fig. 4, on an enlarged scale. Fig. 12 is a similar view in line 6 6, Fig. 4, on an enlarged scale.

Like letters of reference refer to like parts in the several figures.

A represents the floor of the vehicle-body, and B the fixed side walls thereof.

C is the front seat, which is preferably fixed and secured between the front portions of the side walls and provided with a lazy-back C'.

D and E represent a pair of movable deck panels or sections arranged in rear of the fixed front seat C and each serving the additional functions of a rear seat and a lazy-back, the same being suitably cushioned or upholstered on their face sides for this purpose and the two parts being interchangeable in such manner that either may be shifted to form a lazy-back for the other, according as the vehicle is converted into an ordinary two-seated carriage or a dos-à-dos carriage. Each of these deck-panels is provided at one edge with laterally-extending studs or pivots $f$, which are arranged to slide in longitudinal guideways or grooves $g$, arranged on the inner side of the side walls B, as shown in Fig. 6, so that the seats can be shifted forward or backward on the vehicle-body and at the same time swing upon their pivots. These pivots are confined in their guideways by longitudinal retaining bars or flanges $g'$, depending below the upper edges of said ways and engaging with grooved heads $f'$, formed at the outer ends of the pivots, as shown in Figs. 6 and 12. The retaining-bars $g'$ are secured to the inner sides of the side walls B, as shown.

H represents one of a pair of links or braces which connect the two deck-panels D and E and hold the same in their proper relative positions. These links are arranged at the opposite edges of the panels and are pivoted to longitudinal bars or flanges $h$, which are secured to the edges of the panels and which carry the pivots $f$ thereof.

When the vehicle is to be used with a single seat, the two movable panels are swung face downward on their pivots and their pivoted ends are at the same time shifted in opposite directions, so as to slide the pivots of the front panel toward the front ends of the guideways $g$ and the pivots of the rear panel against the rear ends of said guideways, as shown in Fig. 1. In this condition of the vehicle the two panels form the deck thereof, the rear sides or backs of these panels, which are now uppermost, being flush and forming a smooth deck, and the cushions being protected from the weather. The connecting-links H lie horizontally at the edges of the panels in this position of the same. The panels are held in this position by suitable catches $i$, consisting, preferably, of turn-buttons pivoted to the sides of the vehicle-body and bearing upon the adjacent flanges $h$ of the seats, as shown in Figs. 6 and 12. In order to firmly hold the panels in this position, so as to prevent rattling thereof, a spring cushion or buffer $j$, consisting, preferably, of a block of rubber, is arranged on the rear side of the front seat, against which block the front edge of the front panel D bears, as shown in Fig. 1. This elastic block is made of such thickness that compression thereof begins while the two panels are at an angle to each other and before they reach the horizontal position shown in Fig. 1. The two panels thus act as a toggle when depressed, and by the time that they reach a horizontal position the block will have been compressed, thereby effectually preventing vibration of the panels and the noise incident thereto.

When it is desired to convert the vehicle into an ordinary two-seated carriage, the two panels are released by moving the turn-buttons $i$ aside and the free ends of the panels are swung upward to the position shown in Fig. 2. The free end of the rear panel is then swung rearward and its pivots are at the same time shifted to the rear ends of their guideways $g$, as shown in Fig. 3. The pivoted end of the front panel is at the same time shifted rearwardly and its free end swung forwardly and downwardly to the horizontal position shown in Fig. 3. In this position of the parts the front panel D forms the rear seat of an ordinary two-seated vehicle, while the rear panel E forms the lazy-back for said seat, the links H forming inclined braces, which hold the lazy-back in its proper position. The rear seat D is retained in its horizontal position by the turn-buttons $i$, which interlock with notches of the seat.

When it is desired to use the vehicle in the form of a dos-à-dos carriage, the front panel D is released from the turn-buttons $i$ and the same and the lazy-back are reversed to the position shown in Fig. 4, the panel which forms the lazy-back of the rear seat of the ordinary two-seated carriage becoming now the rear seat, and the panel which formed the rear seat becoming now the lazy-back. The pivoted panels are shifted from the position shown in Fig. 3 to that shown in Fig. 4 by swinging the free end of the front panel upwardly and rearwardly and the rear panel rearwardly and downwardly, as indicated by the arrows in Fig. 3, and then shifting the reversed panels toward the stationary front seat until they occupy the position shown in Fig. 4, this position being determined by stops $j'$, which are arranged on the inner side of the side walls of the vehicle and against which the lazy-back or front panel bears. The parts are held in this position by the turn-buttons $i$, which interlock with notches of the seat, and the lazy-back is held in place by the inclined braces H, as in the position shown in Fig. 3. By this construction the panels forming the rear seat and its lazy-back can be conveniently shifted for converting the carriage into the various forms described, and the panels are at the same time reliably attached to the vehicle, so that they cannot get out of order. As the rear seat has its own lazy-back in the dos-à-dos form of the carriage, the annoyance experienced by the occupants of the rear seat when the lazy-back of the front seat is used also as the lazy-back of the rear seat is avoided.

In order to render the movement of the pivoted panels noiseless in moving the same to the position shown in Fig. 1, each of the same is provided at its lateral edges with yielding buffers or rubber blocks $k$, which are arranged to strike against the upper edges of the links H, as shown in Fig. 10. These buffer-blocks are secured in recesses formed in the edges of the seats and project beyond the edges of the seat.

The side walls of the carriage-body are provided immediately in rear of the fixed front seat with recesses or passages L, whereby the occupants of the rear seat enter the carriage. These passages are normally closed by movable upright doors or panels M, arranged to slide lengthwise on the sides of the vehicle, so that upon shifting the same forwardly to the position shown in Fig. 3 the passages L are opened, while upon shifting said doors rearwardly to the position shown in Figs. 1, 2, 4, and 7 the passages are closed. Each of these sliding doors is provided on the inner side of its upper portion with a horizontal track or supporting-rail $n$, which runs upon a double-flanged or grooved antifriction-roller $o$, arranged on the outer side of the side wall of the vehicle-body, as shown in Fig. 11, and below said supporting-rail with a retaining-rail $n'$, which projects into the groove of said antifriction-roller on the under side thereof, so as to aid in retaining the supporting-rail $n$ upon the roller.

Each door is provided behind the rails $n$ $n'$ with a groove or recess $n^2$, into which the antifriction-roller projects, as shown in Fig. 11. The lower portion of each sliding door is supported and guided by an arm or bracket $p$, secured to its lower end, and having at its outer end a headed stud or projection $p'$, which slides in a longitudinal guideway $q$, secured to the lower edge of the carriage-body. This guideway preferably consists of a bar having a longitudinal guide-slot, as shown. The rear portion of this guide-slot is preferably inclined or arranged obliquely, so that the guide-stud $p'$ of the door is wedged or clamped against the edges of the guide-slot upon closing the door, as shown in Fig. 8, thereby preventing rattling of the door. Each door is provided with an additional lock or clamping device for securely holding it in either of its positions, the antifriction-rollers $o$, in conjunction with the supporting-rails $n$ of the doors, being preferably utilized as such clamping means. For this purpose each of the flanged antifriction-rollers is mounted on a bolt or journal $r$, capable of sliding lengthwise in a transverse opening extending through the side wall of the vehicle-body, as shown in Fig. 11. To the projecting inner end of this bolt is applied a clamping device which when tightened draws the bolt inwardly, forcing the outer flange of the antifriction-roller tightly against the supporting-rail $n$ of the door, thereby locking the latter in place by the frictional contact between the roller-flanges and said rail. This clamping device preferably consists of a cam-lever S, secured to the projecting inner end of the bolt $r$, and having a circular cam-face $s$, which bears against a corresponding cam-disk $t$, secured to the adjacent inner wall of the vehicle-body, so that upon turning the cam-lever forwardly the contiguous cam-faces cause the bolt $r$ to be drawn outward, locking the friction-roller $o$ against the rail $n$, while upon turning the lever backward the bolt is shifted outward, releasing the roller from said rail and permitting the door to be freely shifted. In order to facilitate the release of the roller $o$, a spring, consisting, preferably, of a rubber block $u$, is arranged to force the roller outward when unlocked. This block is seated in a recess formed in the side wall of the vehicle-body and bears through the medium of an interposed washer $u'$ against the inner side of the antifriction-roller $o$, as shown in Fig. 11. The block $u$ is made of such a length that when uncompressed it projects beyond the outer end of its recess, so that upon clamping the roller the block is compressed, while upon releasing the roller the block expands and forces the roller outward to its unlocked position.

The ornamental end pieces or railings V of the stationary front seat are preferably separate from the latter and formed with or secured to the sliding doors M, and the rails $n$ $n'$ of the doors are extended to the front edge of said end pieces, as shown in Fig. 3. By this construction the end pieces or railings move forward with the sliding doors upon opening the latter, allowing the doors to temporarily occupy the position normally occupied by said end pieces, thus enabling the doors to stand in the same plane as said end pieces, which would not be the case if the end pieces were secured to the stationary front seat.

The sliding doors are preferably further retained in their closed position by hooks $v$, arranged on the rear portion of the ornamented side railing of the vehicle and engaging with eyes or recesses arranged on the portion of the railing carried by the sliding doors.

The guideways $g$, in which the pivots of the deck-panels D and E slide, are formed partly on the inner sides of the doors and partly on the inner side of the side walls of the vehicle-body, so as to form continuous guideways extending from the rear end of the body to the fixed front seat when said doors are closed, as most clearly shown in Figs. 2 and 4. The rear edges of the sliding doors abut against the rear edges of the entrance-passages M, and the inner sides of the doors are flush with the inner faces of the side walls B. By the use of these sliding doors access can be conveniently had to the rear seat without disturbing the front seat or the occupants thereof, it being only necessary to unlock the doors by loosening the cam-levers S and then slide the doors forward and to again close the doors and lock them.

If desired, a sliding door may be arranged only on one side of the vehicle.

I claim as my invention—

1. The combination with the vehicle-body having a front seat, of pivoted deck panels or sections arranged on the body in rear of the front seat, both capable of assuming a horizontal position, one in front of the other, for forming a deck, and each capable of being shifted lengthwise on the body, whereby each of said panels serves the additional functions of a seat and a lazy-back, substantially as set forth.

2. The combination with the vehicle-body, having longitudinal guideways, of a seat or panel provided with pivots arranged to slide in said guideways, whereby said seat or panel is capable of a combined sliding and swinging movement, substantially as set forth.

3. The combination with the vehicle-body having a front seat and provided in rear of said seat with longitudinal guideways, of a pair of reversible deck panels or sections arranged in rear of said front seat and each provided at its inner end with pivots arranged to slide in said guideways, substantially as set forth.

4. The combination with the vehicle-body having a front seat and provided in rear of said seat with longitudinal guideways, of a pair of reversible deck panels or sections arranged in rear of said front seat and each provided at its inner end with pivots arranged to slide in said guideways, and a link or brace connecting said deck-panels, substantially as set forth.

5. The combination with the vehicle-body provided with a front seat and in rear of said seat with longitudinal guideways, of deck-panels provided at one end with pivots arranged to slide in said guideways, and a spring or cushion interposed between the end of one of said deck-panels and an opposing stationary part of the vehicle-body, substantially as set forth.

6. The combination with the vehicle-body provided with a front seat and in rear of said seat with longitudinal guideways, of deck-panels provided at one end with pivots arranged to slide in said guideways, and a spring or cushion which is arranged on the rear side of the front seat and against which the front deck-panel is adapted to bear, substantially as set forth.

7. The combination with the vehicle-body having a front seat and provided in rear of said seat with longitudinal guideways, of a pair of reversible deck panels or sections arranged in rear of said front seat and each provided at its inner end with pivots arranged to slide in said guideways, and a connecting brace or link pivoted to the edges of said panels, each of said panels being provided at its edge with a buffer or cushion adapted to bear against said link or brace, substantially as set forth.

8. The combination with a vehicle-body having front and rear seats and stationary side walls one of which is provided between said seats with an entrance-passage, of a door adapted to close said passage and arranged to slide forwardly in front of said entrance-passage when opened, substantially as set forth.

9. The combination with a vehicle-body having front and rear seats and stationary side walls, one of which is provided between said seats with an entrance-passage, said front seat being provided with an end piece or railing made separate therefrom, and a longitudinally-sliding door adapted to close said passage and carrying said railing, substantially as set forth.

10. The combination with the vehicle-body having front and rear seats and stationary side walls provided between said seats with entrance-passages and on their inner sides with longitudinal guideways, of longitudinally-sliding doors adapted to close said passages and provided on their inner sides with guideways forming continuations of the ways of said side walls, and deck-panels provided with pivots arranged to slide in said guideways, substantially as set forth.

11. The combination with a vehicle-body having front and rear seats and stationary side walls one of which is provided between said seats with an entrance-passage, of a longitudinally-sliding door adapted to close said passage and provided with a guide-rail, a flanged laterally-movable roller arranged on the vehicle-body and supporting said guide-rail, and a shifting device whereby said roller is moved laterally for clamping the flange of said roller against said rail, substantially as set forth.

12. The combination with a vehicle-body having front and rear seats and stationary side walls one of which is provided between said seats with an entrance-passage, of a longitudinally-sliding door adapted to close said passage and provided with a guide-rail, a flanged laterally-movable roller arranged on the vehicle-body and supporting said guide-rail, a shifting device whereby said roller is moved laterally for clamping the flange of said roller against said rail, and a spring which tends to shift said roller in the contrary direction from said shifting device, substantially as set forth.

13. The combination with a vehicle-body having front and rear seats and stationary side walls one of which is provided between said seats with an entrance-passage, of a longitudinally-sliding door adapted to close said passage and provided with a guide-rail, a roller supporting said rail and mounted on a longitudinally-movable journal or bolt which slides in the side wall of the vehicle-body, and a clamping-lever applied to said sliding bolt and having a cam bearing against a corresponding face of the vehicle-body, substantially as set forth.

14. The combination with a vehicle-body having front and rear seats and stationary side walls one of which is provided with an entrance-passage, of a longitudinal guideway arranged on the side of the vehicle-body below said entrance-passage and a longitudinally-sliding door adapted to close said passage and provided with a guide-arm or projection sliding in said guideway, substantially as set forth.

15. The combination with a vehicle-body having front and rear seats and stationary side walls one of which is provided with an entrance-passage, of a longitudinal guideway arranged on the side of the vehicle-body below said entrance-passage and provided with an oblique end portion, and a longitudinally-sliding door adapted to close said passage and provided with a guide-arm or projection sliding in said guideway, substantially as set forth.

Witness my hand this 30th day of July, 1896.

CHARLES A. HENNICKE.

Witnesses:
 CARL F. GEYER,
 ELLA R. DEAN.